(12) United States Patent
Salice

(10) Patent No.: US 6,257,796 B1
(45) Date of Patent: Jul. 10, 2001

(54) CONNECTION FITTING

(75) Inventor: Luciano Salice, Carimate (IT)

(73) Assignee: Arturo Salice S.p.A., Novedrate (IT)

( * ) Notice: Subject to any disclaimer, the term of this patent is extended or adjusted under 35 U.S.C. 154(b) by 0 days.

(21) Appl. No.: 09/199,961

(22) Filed: Nov. 25, 1998

(30) Foreign Application Priority Data

Nov. 27, 1997 (DE) .......................................... 297 21 068 U

(51) Int. Cl.⁷ ...................................................... F16B 12/16
(52) U.S. Cl. ...................... 403/231; 403/322.4; 403/323; 403/DIG. 8
(58) Field of Search ................................ 403/322.4, 323, 403/322.1, 321, 324, 231, 294, 296, DIG. 8; 312/348.4; 16/387; 411/551

(56) References Cited

U.S. PATENT DOCUMENTS

| | | | |
|---|---|---|---|
| 3,456,969 | * | 7/1969 | Wittenmayer ..................... 403/294 X |
| 4,099,293 | * | 7/1978 | Pittasch ......................... 403/322.1 X |
| 4,664,548 | | 5/1987 | Brinkmann . |
| 5,667,327 | * | 9/1997 | Salice .............................. 403/231 X |
| 5,762,422 | * | 6/1998 | Salice .............................. 403/294 X |

FOREIGN PATENT DOCUMENTS

| | | |
|---|---|---|
| 440608 | 12/1967 | (CH) . |
| 356065 | 7/1922 | (DE) . |
| 372730 | 3/1923 | (DE) . |
| 1963566 | 1/1967 | (DE) . |
| 2112164 | 10/1971 | (DE) . |
| 4437273 | 4/1996 | (DE) . |
| 0400388 | 12/1990 | (EP) . |
| 0432955 | 6/1991 | (EP) . |
| 0507720 | 10/1992 | (EP) . |
| 0672836 | 9/1995 | (EP) . |
| 1340555 | 12/1973 | (GB) . |
| 209013 | 8/1990 | (HU) . |

* cited by examiner

Primary Examiner—Lynne H. Browne
Assistant Examiner—John R. Cottingham
(74) Attorney, Agent, or Firm—Dilworth & Barrese, LLP.

(57) ABSTRACT

The present invention is directed to a connection fitting for the detachable connection of two parts, preferably two furniture parts, including a cup-shaped casing (1) which can be inserted into a channel of the first part, in which casing (1) a bolt (4) is pivoted with a tenon (14,15) protruding over the first part (24), which tenon can be introduced into a borehole of the other part and locked in the same by turning. A radial actuating lever (16) is connected to the bolt (4) and penetrates a hole (21) of the casing (1). Furthermore, an actuating lever (16) which is held in a radially moved manner at the bolt (4) and which is interlocked in a non-twist manner with the same in the inserted position is pivotable relative to the same in a pulled-out position.

23 Claims, 3 Drawing Sheets

CONNECTION FITTING

BACKGROUND OF THE INVENTION

The invention relates to a connection fitting for the detachable connection of two parts, preferably furniture parts, consisting of a cup-shaped casing which can be placed into a channel of the first part, in which casing a bolt with a tenon which protrudes over the first part is pivoted which bolt can be inserted in a borehole of the other part and locked in place in it by a turn, and of a radial actuating lever connected to the bolt which lever penetrates a hole in the casing.

In a connection fitting of this type known from DE 44 37 273 C2, in accordance with a first embodiment the radial actuating lever is permanently connected to the bolt so that it protrudes over the casing even in the locked state and has an unappealing and annoying appearance. If the actuating lever were to be made shorter to allow it to be countersunk in the casing in the locked state, it could only be opened by hand with great difficulty.

In accordance with a second embodiment of the known connection fitting, it is provided that in the region of the casing hole, the bolt is provided with a serrated section and the actuating lever with a ring with a corresponding inside serration which encloses the bolt in such a way that by an axial movement of the actuating lever in the channel said actuating lever can engage and disengage with the serrated section of the bolt. While this embodiment allows a substantial countersinking of the actuating lever in the locked state of the bolt in the casing hole, it is, however, relatively complicated to engage the actuating lever in an interlocking manner with the bolt by an axial movement and then to release it again from the bolt, with the actuating lever not being able to cover the hole completely in the locked state either due to the axial movement capability.

SUMMARY OF THE INVENTION

It is the object of the invention to provide a connection fitting of the type first described which can be mounted easily by hand alone, with the actuating lever not protruding over the casing in the mounted state of the connection fitting and with the connection fitting providing a compact and appealing appearance in the mounted state.

This object is solved in accordance with the invention by a connection fitting with the features decribed herein.

In the connection fitting in accordance with the invention, the actuating lever which can be actuated by hand can be easily interlocked with the bolt by its being pressed into an inserted position. When the bolt is turned into the locked position by the actuating lever, it can be pulled out, thereby the interlocking connection with bolt released and the bolt pivoted into a position in which it can be held in a countersunk manner in the casing.

Appropriately, in the inserted position, the actuating lever engages a radial or lateral opening or recess of the bolt with an extension.

In accordance with a preferred embodiment, it is provided that the bolt is provided with a radial pillar block with lateral tenons parallel to the bolt onto which the legs bent into a fork-like U shape of one side of the actuating lever can be hooked and that the actuating lever engages the recess with an extension protruding over the legs. In this embodiment, the actuating lever is interlocked with the bolt by its engaging the recess with its front tenon-shaped end and being held by the legs bent in a U shape with a region positioned at a distance of the tenons on the bolt so that the lever engages the bolt via a two-point support and a good interlock is ensured. If the lever is pulled out of its interlock position, the tenons of the pillar block form, as it were, the swivel axes for the actuating lever to allow this to be swivelled into its position countersunk into the casing.

Appropriately, the actuating lever consists of a substantially rectangular sheet blank from whose one narrow side legs which protrude over this at the side are bent back in a U shape in such a way that these are protruded over in the bent state by a bar located between them. The protruding bar forms the tenon which engages the channel of the bolt.

Appropriately, the casing hole corresponds to the shape of the actuating lever so that the actuating lever can be pivoted in its withdrawn state around the tenons of the pillar block in such a way that it covers the hole.

The actuating lever can be insertable into the hole in such a way that its outside is flush with the plane outside of the casing.

Appropriately, the bolt is provided with a radial protrusion which forms a stop for a casing-integral abutment and limits the turn of the bolt.

To lock the tenon which extends the length of the bolt in a borehole of the other part, the tenon can, for example, be provided with a thread. Appropriately, however, the tenon is connected eccentrically to the front side of the bolt in the manner known from DE 44 37 273 C2, with a washer provided with a cutting bar being fixed on the eccentric shaft part as the locking piece. The washer can additionally be provided with at least one cutting thread. Furthermore, the casing can be provided with a tenon-like extension of the type known from DE 44 37 273 C2 which is provided with an eccentric borehole in which the bolt is supported.

BRIEF DESCRIPTION OF THE DRAWINGS

One embodiment of the invention is described in more detail below by means of the drawing in which.

DESCRIPTION OF THE PREFERRED EMBODIMENTS

Figure 3:
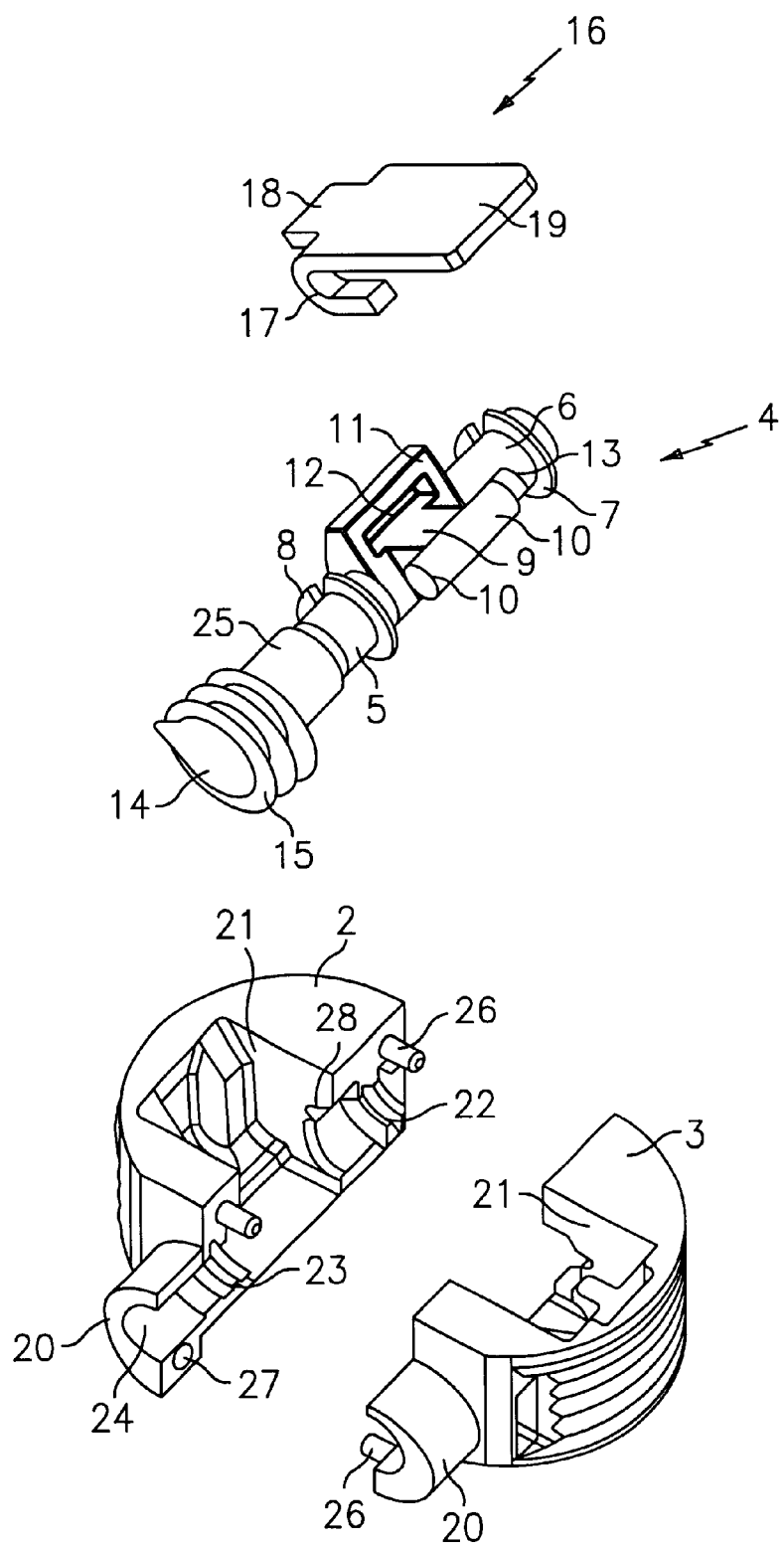
FIG. 3 shows the connection fitting of FIGS. 1 and 2 in a perspective and exploded position of its components.

The connection fitting consists of a casing 1 assembled from the casing parts 2, 3, in which casing 1 the bolt 4 which can be seen best in FIG. 3 is supported. The bolt 4 consists of an elongated shaft 5 with different sections. One section 6 on the end side is provided with a thread 7. A thread 8 of the same type and same direction is provided in the middle region of the shaft 5. Between the threads 6, 8, the shaft 5 bears a radial pillar block 9 which is roughly triangular in cross-section which is provided at its upper end with axis tenons 10 which protrude laterally, that is in the axial direction of the bolt 5, over said threads. In addition to the pillar block 9, the shaft 5 possesses a further widening 11 which is provided with a rectangular recess 12 at the junction to the pillar block 9. The flank of the pillar block 9 which can be seen in FIG. 3 runs flush into the inner side wall of the recess 12.

Between the thread 7 and the pillar block 9, the shaft 5 possesses a radial protrusion 13 which forms a stop.

The front end of the shaft is formed by a tenon 14 on which a cutting thread 15 is set eccentrically.

An actuating lever 16 can be hooked on the lateral tenons 10 of the pillar block 9 by means of lateral hooks 17 bent in a U shape. The actuating lever 16 is bent from a substantially rectangular sheet blank, with the legs 17 forming the hook first enclosing a rectangular protrusion 18 located between them and cut free into a tenon-shape by lateral cuts. The hooks 17 are formed be bending back the legs, with the freely tapering ends of the legs running parallel to the main part 19 of the actuating lever 16. The rectangular, tenon-shaped extension 18 corresponds in shape to the recess 12 so that this extension can be pushed into the recess 12 after the hooking of the actuating lever onto the tenons 10 of the pillar block 9. The freely tapering legs of the U-shaped hooks are so long that they do not slide off the tenons 10 when the tenon-like protrusion 18 of the actuating lever 16 is pushed completely into the recess 12. In the inserted state, the actuating lever 16 is thus connected in a non-twist manner to the shaft 5 of the bolt so that this can be turned by means of the actuating lever 16, with this being supported both in the recess 12 and via the legs of the hooks 17 at the lateral tenons 10 of the pillar block 9.

If the actuating lever 19 is pulled out of the recess 12, the outward movement is limited by the tenons 10 engaging the arcs formed by the bending of the hooks 17 so that the actuating lever 19 can be pivoted around the tenons 10 after its interlock detachment from the bolt 4.

The bolt 4 is appropriately made as a die-cast part, for example from ZAMAK die casting zinc alloy.

The casing 1 consists of the two parts 2, 3 which are made as injection-molded parts in plastic.

The casing 1 possesses a cup shape and is provided with an extension 20. The casing possesses a middle channel 21 in which the pillar block 9 and the extension 11 with the channel 12 are located. In its front and back end regions, the casing 1 is provided with sections 22, 23 which are formed complementary to the shaft 5 with the threads 6, 8. The front tenon-shaped extension 20 of the casing is provided with an eccentric borehole 24 in which the cylindrical section 25 of the bolt 4 is supported. The casing halves 2, 3 are provided in their central division plane with tenons 26 and complementary boreholes 27 which serve the purpose of centration and holding in the assembly of the casing parts.

In addition, the casing is provided to the side of the central channel or the central hole 21 with a hollow 28 whose one flank forms an abutment for the stop 13 which limits the turn of the bolt by the actuating lever 16.

To mount the connection fitting, the actuating lever 16 is hooked with its hook-shaped parts 17 on the tenons 10 of the pillar block 9 before the bolt 4 is inserted into the channels formed in a contour-matching manner of one casing half and the other casing half pressed on to close the casing. In this way, the actuating lever is fixed in the casing as the tenons 10 prevent any pulling out and an unhooking is impossible in that the actuating lever abuts casing parts before the legs of the hook-shaped parts 17 can slide off the tenons 10.

Figure 1A:
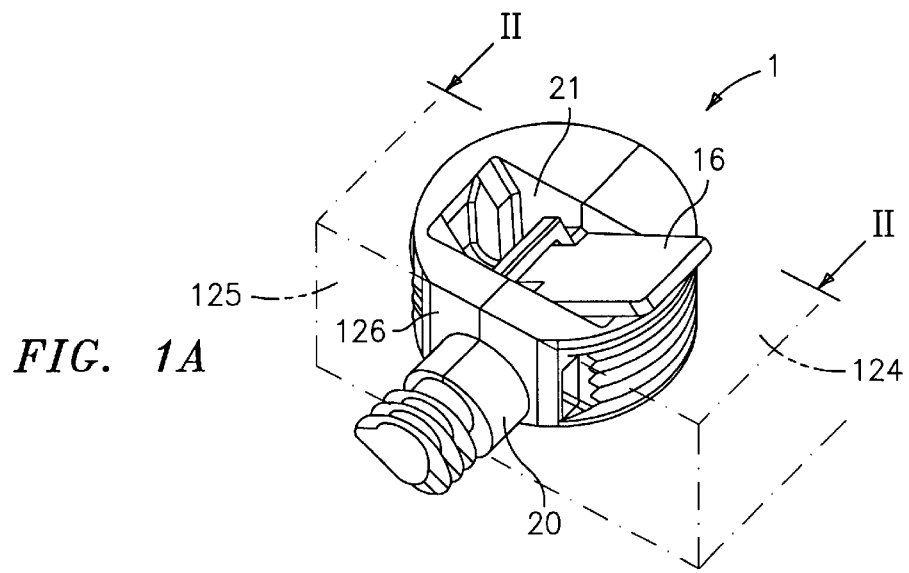
FIG. 1a to FIG. 1c show a perspective view of the connection fitting with different turn positions of the bolt and different positions of the actuating lever.
Figure 1B:
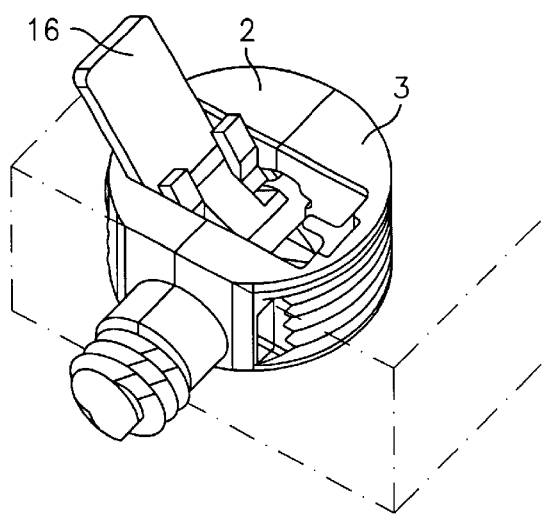
Figure 1C:
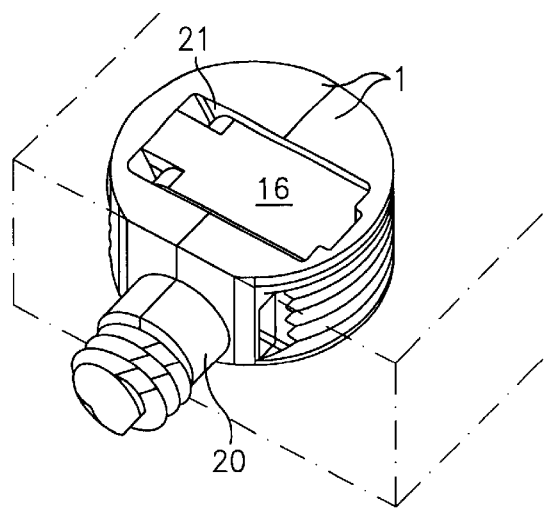

For the purpose of its mounting, the cup-shaped casing 1 is inserted in the usual way into a blind-type borehole of a plate or a piece of furniture 124. In this process, the blind borehole is introduced in such a way that it intersects a front face edge 125 of the plate 124, with the intersected part of the borehole being closed by the front face 126 of the cup-shaped casing. The casing protrudes over the front side 125 of the piece of furniture with its tenon-shaped extension 20. The borehole of the other part to be connected by the connection fitting corresponds in its diameter to the tenon-shaped extension 20 of the casing 1. For the purpose of assembly, the bolt 4 is then turned via the actuating lever 16 into a position visible from FIG. 1. In this position, the eccentricities of the borehole 24 and of the eccentric arrangement of the thread 15 on the shaft 5 cancel each other out so that the thread 15 is flush with the tenon-shaped extension 20. If, after the introduction of the threaded part 15 and the shaft part 20 into the complementary borehole, the bolt 4 is turned by the actuating lever 16 by around 90° out of the position visible in FIG. 1a into the position visible in FIG. 1b, due to the eccentricities one side of the cutting thread 15 moves out of the sleeve area of the tenon-shaped extension 20, as can be seen in FIGS. 1b and 1c. The actuating lever 16 can be pulled out of the position in FIG. 1b so that the tenon-shaped extension 19 leaves the recess 12 in the extension 11 and the actuating lever 16 and the tenons 10 can be swivelled into the position visible in FIG. 1c in which it essentially completely covers the channel 21 and lies with its surface flush to the plane outside surface of the casing 1.

Figure 2A:
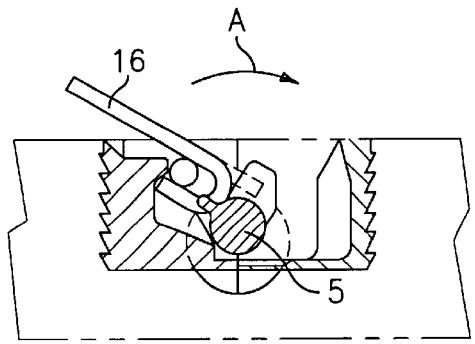
FIG. 2a to FIG. 2d show cross-sections through the connection fitting along the line II—II in FIG. 1a in the positions visible from FIG. 1.
Figure 2B:
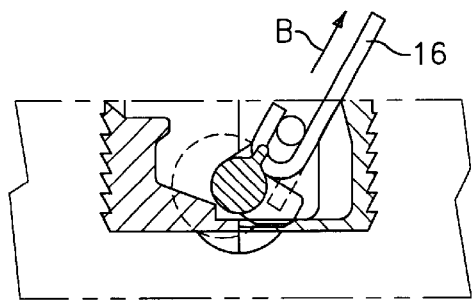
Figure 2C:
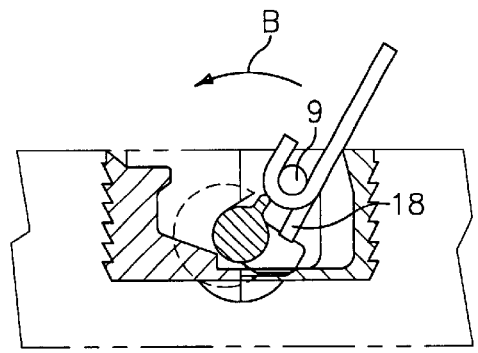
Figure 2D:
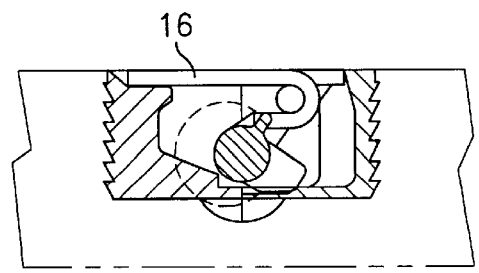

The threads 6, 8 possess an opposing pitch to the thread 15 so that after the assembly of the parts to be connected, these can be pulled together and any gap existing between them disappears. It can be seen from FIG. 2 how the locking turn is made by swivelling the actuating lever 16 in the direction of the arrow A by about 90° in the position visible from FIG. 2b. After the locking, the actuating lever is pulled out in the direction of the arrow B so that the extension 18 leaves the hollow 12 and the actuating lever 16 can be pivoted in the direction of the arrow B around the tenons 9 into its closure position visible from FIGS. 1c and 2d.

What is claimed is:

1. A connection fitting for the detachable connection of two parts, comprising
    a cup-shaped casing (1) which can be inserted into a channel of a first part, in which casing (1) a bolt (4) is pivoted with a tenon (14, 15) protruding over the first part (124), which tenon can be introduced into a borehole of another part and locked therein by turning;
    a radial actuating lever (16) connected to the bolt (4) which lever penetrates a hole (21) of the casing; and
    said actuating lever (16) being held in a radially moving manner at the bolt (4) and which is interlocked in a non-twist manner with the bolt (4) in the inserted position and which is pivotable relative to the bolt (4) in a pulled-out position, wherein
    said actuating lever (16) is structured and arranged to be engageable with and disengageable from said bolt (4) in a radial direction with respect to said bolt (4).

2. A connection fitting in accordance with claim 1 wherein the actuating lever (16) engages in its inserted position a radial or lateral opening or recess (12) of the bolt (4) with an extension (18).

3. A connection fitting for the detachable connection of two parts comprising
    a cup-shaped casing (1) which can be inserted into a channel of a first part, in which casing (1) a bolt (4) is pivoted with a tenon (14,15) protruding over the first part (124), which tenon can be introduced into a borehole of another part and locked therein by turning;
    a radial actuating lever (16) connected to the bolt (4), which lever penetrates a hole (21) of the casing; and
    said actuating lever (16) being held in a radially moving manner at the bolt (4) and which is interlocked in a non-twist manner with the bolt (4) in the inserted position and which is pivotal relative to the bolt (4) in a pulled-out position, wherein the bolt (4) is provided with a radial pillar block (9) with lateral tenons parallel to the bolt (4) on which tenons legs (17) bent into a fork-like U-shape of one side of the actuating lever (16) can be hooked and wherein the actuating lever (16) engages a recess (12) of the bolt (4) with an extension (18) protruding over the legs.

4. A connection fitting in accordance with claim 1 wherein the actuating lever (16) comprises of a substantially rectangular sheet blank having legs (17) which are bent back in a U shape in such a way that the legs (17) are protruded over in the bent state (17) by a bar (19) located between the legs (17).

5. A connection fitting for the detachable connection of two parts, comprising a cup-shaped casing (1) which can be inserted into a channel of a first part, in which casing (1) a bolt (4) is pivoted with a tenon (14,15) protruding over the first part (124), which tenon can be introduced into a bore-hole of another part and locked therein by turning;

a radial actuating lever (16) connected to the bolt (4), which lever penetrates a hole (21) of the casing; and said actuating lever (16) being held in a radially moving manner at the bolt (4) and which is interlocked in a non-twist manner with the bolt (4) in the inserted position and which is pivotal relative to the bolt (4) in a pulled out position, wherein the casing hole (21) corresponds to the shape of the actuating lever (16) and the actuating lever (16) is pivotable in the extended state around tenons (10) of a pillar block (9) on the bolt (4) in such a way that the lever (16) covers the hole (21).

6. A connection fitting in accordance with claim 1 wherein the actuating lever (16) can be pressed into the hole (21) in such a way that the outside of the lever (16) is flush with the plane outside of the casing (1).

7. A connection fitting in accordance with claim 1 wherein the bolt (4) is provided with a radial protrusion (13) which forms a stop for a casing-integral abutment (28) and limits the turn of the bolt (4).

8. A connection fitting in accordance with claim 2, wherein the actuating lever (16) comprises a substantially rectangular sheet blank having narrow side legs (17) which are bent back in a U shape in such a way that the legs (17) are protruded over in the bent state (17) by a bar (19) located between the legs (17).

9. A connection fitting in accordance with claim 3, wherein the actuating lever (16) comprises a substantially rectangular sheet blank having the legs (17) which are bent back in a U shape in such a way that the legs (17) are protruded over in the bent state (17) by a bar (19) located between the legs (17).

10. A connection fitting in accordance with claim 3, wherein the casing hole (21) corresponds to the shape of the actuating lever (16) and the actuating lever (16) is pivotable in the extended state around tenons (10) of a pillar block (9) on the bolt (4) in such a way that the lever (16) covers the hole (21).

11. A connection fitting in accordance with claim 2, wherein the actuating lever (16) can be pressed into the hole (21) in such a way that the outside of the lever (16) is flush with the plane outside of the casing (1).

12. A connection fitting in accordance with claim 3, wherein the actuating lever (16) can be pressed into the hole (21) in such a way that the outside of the lever (16) is flush with the plane outside of the casing (1).

13. A connection fitting in accordance with claim 4, wherein the actuating lever (16) can be pressed into the hole (21) in such a way that the outside of the lever (16) is flush with the plane outside of the casing (1).

14. A connection fitting in accordance with claim 5, wherein the actuating lever (16) can be pressed into the hole (21) in such a way that the outside of the lever (16) is flush with the plane outside of the casing (1).

15. A connection fitting in accordance with claim 2, wherein the bolt (4) is provided with a radial protrusion (13) which forms a stop for a casing-integral abutment (28) and limits the turn of the bolt (4).

16. A connection fitting in accordance with claim 3, wherein the wherein the bolt (4) is provided with a radial protrusion (13) which forms a stop for a casing-integral abutment (28) and limits the turn of the bolt (4).

17. A connection fitting in accordance with claim 4, wherein the bolt (4) is provided with a radial protrusion (13) which forms a stop for a casing-integral abutment (28) and limits the turn of the bolt (4).

18. A connection fitting in accordance with claim 1, wherein said actuating lever (16) is structured and arranged to be retained in a radially-moving manner at the bolt (4) and being interlocked in a non-twist manner with said bolt (4) in the inserted position, and furthermore being pivotal relative to the bolt (4) in a pulled-out position to be tiltable into the recess or hole (21) of the casing (1).

19. A connection fitting according to claim 18, wherein said casing (1) is assembled from two separate casing parts (2,3) to define said recess (21) as a middle channel on the top thereof when said parts (2,3) are joined.

20. A connection fitting according to claim 19, wherein said casing parts (2,3) are structured and arranged to define, when joined together, a front tenon-shaped extension (20) provided with an eccentric borehole (24) arranged to support a cylindrical section (25) on the bolt (4) when inserted thereinto, and said casing parts (2,3) being provided in a central division plane, with tenons (26) and complementary boreholes (27) structured and arranged for centering and retaining assembly of the casing parts (2,3) together.

21. A connection fitting in accordance with claim 3, wherein the actuating lever (16) engages, in its inserted position, a radial or lateral opening or recess (12) of the bolt (4) with an extension (18).

22. A connection fitting in accordance with claim 5, wherein the actuating lever (16) engages, in its inserted position, a radial or lateral opening or recess (12) of the bolt (4) with an extension (18).

23. A connection fitting in accordance with claim 5, wherein the actuating lever (16) comprises a substantially rectangular sheet blank having legs (17) which are bent back in a U-shape in such a way that the legs (17) are protruded over in the bent state (17) by a bar (19) located between the legs (17).

* * * * *